United States Patent [19]
Andresen, Jr.

[11] 3,936,797
[45] Feb. 3, 1976

[54] RADAR-BAROMETRIC ALTITUDE INDICATOR

[75] Inventor: John H. Andresen, Jr., Georgetown, British W. Indies

[73] Assignee: Intercontinental Dynamics Corporation, Englewood, N.J.

[22] Filed: May 28, 1974

[21] Appl. No.: 473,514

[52] U.S. Cl. ..... 340/27 AT; 340/324 R; 340/27 NA; 343/12 A
[51] Int. Cl.² .......................................... B64D 43/00
[58] Field of Search.... 343/12 A; 340/27 R, 27 NA, 340/27 AT

[56] References Cited
UNITED STATES PATENTS

| | | | |
|---|---|---|---|
| 3,537,086 | 10/1970 | Andresen | 340/27 R X |
| 3,601,791 | 8/1971 | Emerson | 340/27 NA |
| 3,715,718 | 2/1973 | Astengo | 340/27 R |

*Primary Examiner*—T. H. Tubbesing
*Attorney, Agent, or Firm*—Ostrolenk, Faber, Gerb & Soffen

[57] ABSTRACT

An aircraft instrumentation having inherent self-checking features. Radar and barometric altitude information are displayed on the dial face of a single instrument. A cooperating dial and first pointer displays barometric altitude. A manually settable indicator "bug" cooperates with the dial to provide a presentation of the height of the airstrip relative to sea level. A second indicator "bug" of a different shape from the landing field bug is servo-driven from both radar and barometric altitude signal inputs to provide a presentation of aircraft altitude relative to the terrain beneath the aircraft. The angle between the barometric altitude pointer and servoed radar altitude "bug," measured counterclockwise, constitutes the distance of the aircraft above the airstrip or other terrain which the aircraft is passing over. Upon touchdown both "bugs" should be in exact coincidence, thereby serving as a self-check upon accuracy of the instrumentation.

7 Claims, 2 Drawing Figures

RADAR-BAROMETRIC ALTITUDE INDICATOR

The present invention relates to aircraft instrumentation and more particularly to a novel combined radar-barometric altitude presentation to provide a simplified display and having inherent self-checking features.

BACKGROUND OF THE INVENTION

The barometric altimeter is the established primary standard of altitude used for vertical separation and landing of aircraft. However, in cases of low ceiling landings such as, for example, Category II and III, the overall accuracy of barometric altimeter system is generally deemed to be inadequate, from the viewpoint of safety. Vertically down-looking radar is capable of providing an accurate measure of distance from the aircraft to the ground, which distance is typically referred to as "radar altitude" or "terrain clearance." This data is presently employed as a second altitude reference for landing, since its accuracy is excellent at low altitudes right down to touchdown. The reading is not affected by the various errors inherent in barometric altitude systems.

In current practice, pilots employ barometric altitude to a level of about 1000 feet above landing altitude. Below that height the pilot refers to the radar altitude (terrain clearance) which provides the pilot with information relating to the ground profile under the approach path. When the profile is level, the radar altimeter may be considered by the pilot as his primary altitude reference with the barometric altimeter serving as a check, if these instruments have shown to be in agreement immediately prior thereto.

Up to the present time, these instruments are substantially independent of one another and no existing technique or apparatus exists for integrating these instruments into a composite display which is more meaningful in existing displays, is simpler to read and which provides novel inherent self-checking capabilities.

BRIEF DESCRIPTION OF THE INVENTION

The present invention is characterized by providing an integrated instrument combining barometric and radar altitude presentations in a single indicator in such a manner that any inacccuracy or failure of either source of altitude is immediately apparent. The novel instrument of the present invention enables the pilot to use only one reference, namely the barometric altimeter pointer, during the complete landing. The instrument permits the landing to be made either on the QNH or the QFE barometric setting system wherein on landing, the QNH barometer reads feet above sea level and the radar altimeter reads "0" and wherein the QFE system is such that both barometer and radar altimeters read "0" regardless of the altitude of the airfield above sea level. The instrument of the present invention displays directly any disparity between radar and barometric altitude and in accomplishing the above objects, provides redundant altitude information from completely independent sources within a single presentation.

The present invention comprises apparatus which includes a single dial face having graduations around its periphery which cooperate with a dial pointer to provide a barometric altitude reading. This reading also cooperates optionally with a digital type display and a minimum radar altitude warning.

A settable index is provided to be moved about the periphery of the altimeter dial and is arranged to be positioned through a manually operable control knob to enable the pilot to set the landing field altitude into the instrument. A second index pointer of a different and complementary shape is servo-driven from both radar and barometric altitude signal inputs, the second index also being movable about the periphery of the dial face to cooperate with the barometric altitude pointer in order to provide a reading representing radar altitude which is determined by the angular separation between the indices and the pointer. A digital display of radar altitude is also provided on the dial face of the instrument, as well as a counter for indicating the barometric setting for the barometric altimeter. Means are also provided for adjusting the radar minimum decision height (MDH) and visual lamp means are provided to warn the pilot when the aircraft is at or below the MDH. The inherent self-checking feature resides in the fact that the two indices should be exactly superimposed upon one another at touchdown, thus providing an automatic check upon the accuracy of the instrumentation.

BRIEF DESCRIPTION OF THE FIGURES AND OBJECTS

It is therefore one object of the present invention to provide a combined barometric altitude and radar altitude in a single presentation in which adjustable indices cooperate with one another to provide a radar altitude reading.

Still another object of the present invention is to provide a novel instrument in which barometric and radar altitude presentations are combined in a single dial face and further in which a servo-driven index is employed to provide a radar altitude reading, and a manually adjustable index is employed to show landing field altitude, said indices further cooperating to provide a novel inherent self-checking feature for automatically determining the accuracy of the instrument.

The above as well as other objects of the present invention will become apparent when reading the accompanying description and drawing in which.

DETAILED DESCRIPTION OF THE INVENTION

Figure 1:
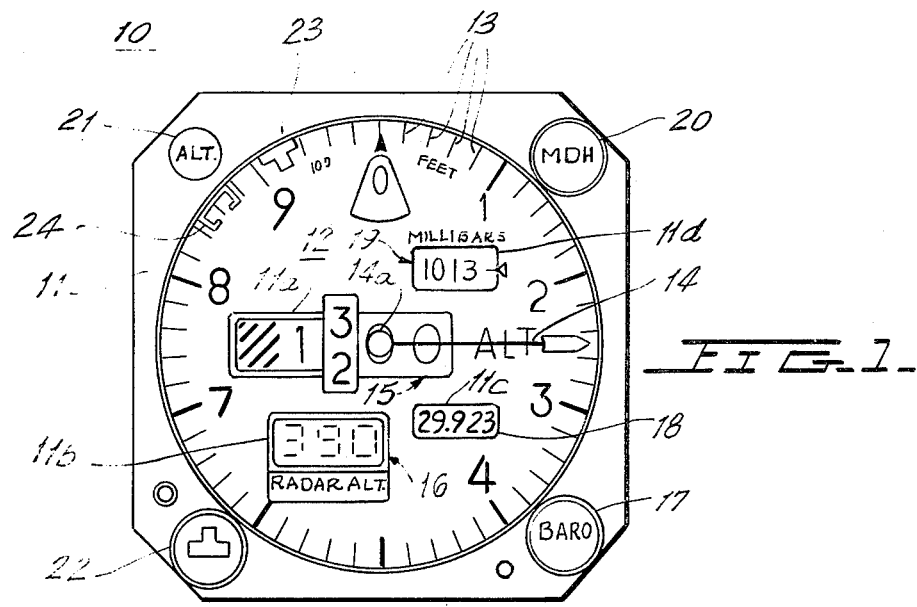
FIG. 1 shows an instrument dial face embodying the principles of the present invention.

FIG. 1 shows the instrument dial face 10 of the present invention comprised of a frame 11 having an opening for the visual observation of dial face 12. The periphery of the dial face is provided with equispaced radially aligned graduations 13 which cooperate with a dial pointer 14 pivoted at 14a to yield an altitude reading in hundreds of feet with one full revolution from the "twelve o'clock position" yielding a reading range from 0–1000 feet.

The dial face is provided with a window 11a behind which is positioned a digital display 15 representing the barometric altitude up to a range of thousands of feet where the two least significant digits are always displayed as "00."

A digital display 16 is positioned behind a second window 11b in dial face 11, which display may be of the segmented type to provide a radar altitude reading in hundreds of feet.

A manually operable knob 17 is provided for adjusting the barometric setting for the barometric altitude, and windows 11c and 11d are provided in dial face 11 to permit a barometric reading 18 in inches of mercury and a millibar reading 19 to be visually observed so as to provide a direct indication of adjustment of barometric altitude adjustment knob 17.

A control knob 20, manually operable from the front face of the instrument, is provided for adjusting the minimum decision height (MDH). This knob is mechanically and electrically connected with the radar altitude display to adjust the MDH value. A detailed description of this capability is set forth in copending U.S. application Ser. No. 333,807, now U.S. Pat. No. 3,890,614, filed Feb. 20, 1973, and assigned to the assignee of the present invention. Therefore a detailed arrangement of this operation will be omitted herein for purposes of simplicity, reference being had to the above mentioned copending application which is incorporated herein by reference thereto. Briefly, adjustment of MDH is performed by depressing control knob 20 to cause the output of a potentiometer connected thereto to be applied to the input of an analog to digital converter which, in turn, is temporarily connected to the radar altitude display 16. By rotating knob 20 the MDH is displayed in the radar altimeter display 16. Once the MDH is set, knob 20 is released to disconnect the aforementioned potentiometer from the radar segmented digital display 16. However, the MDH level will now be retained by the aforesaid potentiometer which is coupled to a comparator circuit to cause a lamp 21 to be illuminated whenever the aircraft is at or below the MDH level which has been set into the instrument.

The instrument 10 is further provided with a manually operable control knob 22 which is mechanically coupled to an index or bug 23 which is designed to move along a curved path coincident with the periphery of dial face 11. Rotation of knob 22 permits the setting of bug 23 to a value reading representative of the height of the airstrip above sea level for QNH landings or is set to zero for QFE landings.

The barometric altimeter driving pointer 14 may utilize a self-contained transducer with servo, a synchro-servo receiving course and fine synchro inputs from an air data computer, or a synchro-servo with a standby mode which servos a self-contained transducer. Regardless of the drive means employed, the device should further include an electrical output of barometric altitude pointer indication.

In setting the "bug," the number of thousands of feet are omitted in the reading. For example, if the bug is set at number "4" of the dial, this setting can be interpreted to mean 400 feet, 1400 feet, or 7400 feet. If the QFE system is used, the landing field altitude is considered to be 0 and the bug 23 should therefore be set at the "0" graduation of the altimeter dial.

A second bug 24, which has a different and complementary shape relative to bug 23, is servo-driven from both radar and barometric altitude signal inputs so that the angle from the barometric altitude pointer 14 in a counterclockwise sense is equal in feet (as read on the dial 11) to the radar altitude.

Figure 2:
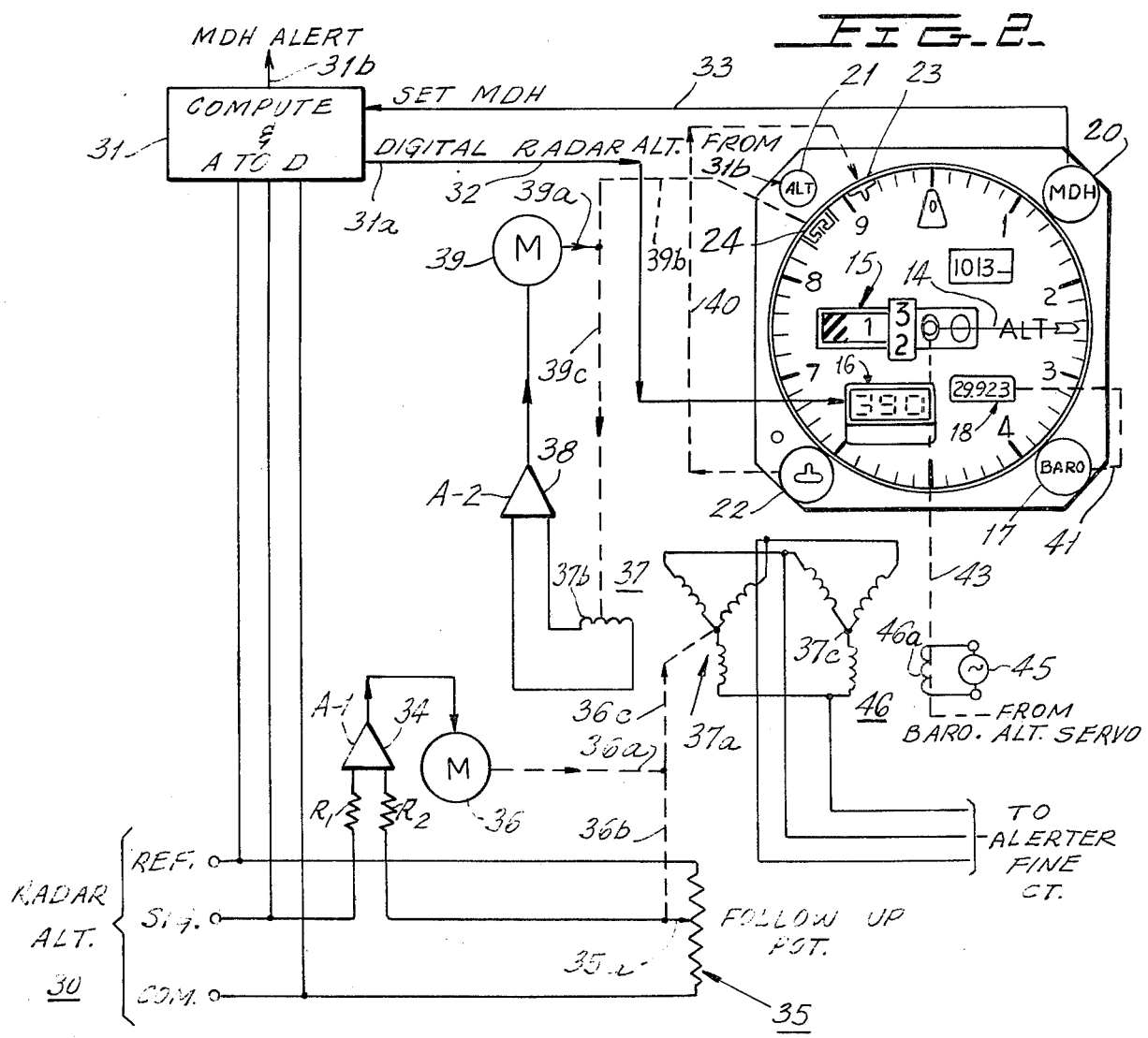
FIG. 2 shows the dial face of FIG. 1, together with a schematic diagram of the associated control circuitry which likewise embody the principles of the present invention.

The mechanism for accomplishing this is schematically shown in FIG. 2, as will be more fully described.

The segmented digital display 16 provides readings in 10 ft. increments of radar altitude. The MDH can be set for both the barometric and radar altitudes such that lamp 21 will light when the aircraft is at or below the MDH. If desired, a remote warning of the selected MDH can also be provided.

FIG. 2 shows the electromechanical circuitry employed in conjunction with the instrument 10.

Radar altitude information is introduced at 30 and is applied to the analog-to-digital and compute circuit 31 which serves to convert the analog input representing radar altitude into a digital representation which, in turn, is converted by a decoder means to provide appropriate signals to the segmented display 16 to provide a visually observable numeric display of radar altitude. The specific arrangement for development of the digital signals and the display drive signals is set forth in detail in the above mentioned copending application Ser. No. 333,807 and a detailed description has been omitted herein for purposes of simplicity. However, FIG. 2 shows output 31a of circuitry 31 as being coupled through a line 32 for appropriately illuminating the segmented display 16.

The circuitry 31 also incorporates the aforementioned potentiometer connected to the control knob 20 through line 33, which potentiometer setting is compared against the instantaneous radar altitude to develop the MDH alert signal at output 31b, which is connected to warning lamp 20 and/or a remote warning device.

The radar altitude signal, in analog form, is further applied to a differential servo-amplifier 34 where it is subtracted from the output of follow-up potentiometer 35 which also includes a movable slider arm 35a. The input signals to servo-amplifier 34 are coupled through summing resistors $R_1$ and $R_2$. The output of servo-amplifier 34 is coupled to a servo-motor 36 whose mechanical output, represented by broken line 36a, is mechanically coupled to slider arm 35a and the stator 37a of a first synchro-control transformer 37, which mechanical connections are represented by broken lines 36b and 36c, respectively.

The analog signal 30, after amplification at 34, drives servo-motor 36 in such a manner as to adjust slider arm 35a to obtain zero difference at the amplifier input. This mechanical output is also coupled to stator 37a of a synchro-control transformer which is rotated through an angle proportional to the radar altitude analog signal. The angular orientation of stator 37a relative to rotor winding 37b creates an electrical signal whose magnitude is a function of the aforesaid relative angle therebetween. This signal is applied to a servo-amplifier 38 and then to a servo-motor 39 to convert the analog signal into a mechanical output represented by broken line 39a which, in turn, is coupled to both the servo-driven bug 24 and to the rotor 37b as represented by broken lines 39b and 39c, respectively. The synchro-chain is utilized to position the index 24 a distance from the moving barometric altitude pointer 14 by an amount equal to the radar altitude on the same scale. It should be noted that if the barometric altitude system malfunctions, the radar altitude is still a valid reading and vice versa.

The mechanical connection between manually operable knob 22 and bug 23 is represented by broken line 40. The mechanical connection between manually operable control knob 17 and barometric pressure indicator 18 is represented by broken line 41.

The altimeter pointer 14 which, as was mentioned hereinabove, may be driven by a self-contained transducer with servo device, is mechanically coupled to the device. The servo-drive also rotates through mechanical connection 43 a fine synchro-transmitter comprising a signal source 45 and rotor 46a of a second synchro-transformer 46, whose stator output signal 37c is connected to the stator winding 37a. Thus, it can be seen that the output from the barometric altitude servo is summed with the analog signal representative of radar altitude (30) to control the movement of index 24.

The operation of the instrument described hereinabove is as follows:

Before final approach to landing, the pilot sets reminder bug 23 through manually operable control knob 22 so that the bug 23 cooperates with the barometric altitude dial to display field altitude in the case where QNH is used or the pilot sets the bug 23 to "0" if QFE barometric setting is preferred. MDH is set by depressing knob 20 and rotating it until the desired MDH reading is displayed at 16. Display 16 is designed to be illuminated whenever the aircraft is below 1000 feet terrain clearance. If it is desired to use the alerting system which is in the altimeter as an additional warning based on a minimum barometric altitude, this can be done by setting the alerter to field altitude or "0" for either QNH or QFE landings.

As the aircraft descends on an approach path in which the terrain (or water) beneath the aircraft is fairly flat and at airstrip level, the reminder bug and radar bug should remain close together. This is due to the fact that the distance from the pointer 14 to each bug represents the altitude above the ground measured counterclockwise from pointer 14. If the terrain beneath the aircraft on the approach path is below that of the airport, the radar bug 24 will be further from pointer 14 than the reminder bug 23. If the terrain beneath the aircraft is higher than the altitude of the air field, the radar bug 24 will be closer to pointer 14 than the reminder bug 23 is (again measured in the counterclockwise direction).

If both radar and barometric altitude systems are working correctly and accurately, the two bugs 23 and 24 will be coincident during the last moments prior to and at touchdown. Where this coincidence (i.e., superimposition) of the bugs exist, the pilot can then have complete confidence in the altitude reading because both altitude systems must be correct to get this condition thereby indicating:

a. that the radar antenna, supply power, electrical circuits and output are accurate;

b. that the static system, altitude transducer are accurate, the supply power, the static defect correcting system is functioning and accurate and that the barometric setting and field elevation settings introduced into the instrument by the pilot have been performed correctly and accurately.

Errors in any of the above equipment and/or operations will cause the bugs to separate on approach above level ground. The indicator itself, including all servos, must be functioning correctly for this logic to be valid and hence failure monitoring of the servos and circuitry is included into the system. If the bugs are separated for any reason, the pilot must first assume that the closest altitude bug to the pointer is the correct one and take appropriate action.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An instrument for use in aircraft comprising:
  a dial face having graduations;
  a mechanism including a movable pointer cooperating with said graduations to provide a corrected barometric altitude reading;
  a first index movable along said graduations;
  manually operable knob means coupled to said first index for positioning said first index at any desired location along said graduations to provide an altitude reading representative of the altitude of an aircraft landing strip typically relative to sea level;
  second index means movable along said graduations;
  first means for receiving a signal representative of radar altitude;
  second means for receiving a first signal representative of barometric altitude;
  third means for combining the signals received from said first and second means for positioning said second index at a position along said graduations to provide an instantaneous reading relative to said movable pointer of the height of the aircraft above the terrain over which the aircraft is passing whereby the separation distance between said first and second indices represents the difference in height between the aircraft landing strip whose height has been set into said instrument and the height of the terrain below the aircraft, said first and second indices cooperating to provide a self-checking feature to determine the accuracy of the information introduced into the instrument and of the operation of the instrument such that the first and second indices should be superimposed upon one another before touchdown of the aircraft on the aforesaid landing strip.

2. The device of claim 1 wherein said dial face is of generally circular shape and said graduations are arranged in radial fashion about the periphery of said dial face;
  said manually operable knob means and said third means respectively move said first and second indices along a circular path adjacent to and along said dial face periphery.

3. The device of claim 1 wherein said mechanism is adapted to move said pointer in the clockwise direction responsive to an increase in barometric altitude and wherein said third means moves said second index along the periphery of the dial face in the clockwise direction responsive to an increase in altitude above the terrain beneath the aircraft;
  the angular distance between said pointed and said second index measured by said graduations in the counterclockwise direction indicating the altitude of the aircraft relative to the terrain beneath.

4. The device of claim 1 wherein said first means comprises a first servo having an output shaft rotated through an angle determined by the first signal controlling said first servo;
  said third means comprising a first synchro-transformer having a first rotatable synchro-stator coupled to said output shaft and a first synchro-rotor inductively coupled to said first synchro-stator;
  a second synchro-transformer having a second stator electrically connected to said first synchrostator and having a second rotatable rotor inductively coupled to said second stator;

a signal source being electrically coupled to said second rotor;

said second rotor being rotatably driven by said second means;

a second servo electrically coupled to said first rotatable rotor for driving said second index.

5. The device of claim 4 wherein the output of said second servo is mechanically coupled to said first synchro-rotor for rotating said first synchro-rotor to null the output of said first synchro-rotor applied to the input of said second servo.

6. The device of claim 4 further comprising means coupled to said output shaft for developing a follow-up signal;

said first means being responsive to said radar altitude signal and said follow-up signal to develop a zero output when said follow-up signal is equal to said radar altitude signal to terminate rotation of said output shaft.

7. The device of claim 1 wherein one of said first and second indices has a substantially C-shaped configuration; and the remaining one of said first and second indices has a straight pointer portion adapted to be positioned between the arms of said C-shaped pointer when the aircraft's barometrically derived altitude and radar derived altitudes are equal.

* * * * *